(12) United States Patent
Dahlke et al.

(10) Patent No.: US 10,542,675 B2
(45) Date of Patent: Jan. 28, 2020

(54) DRIVER UNIT FOR A ROTARY CONVEYOR, DRIVE FINGER AND ROTARY CONVEYOR

(71) Applicant: CLAAS Selbstfahrende Erntemaschinen GmbH, Harsewinkel (DE)

(72) Inventors: Christian Dahlke, Gütersloh (DE); Stefan Liedmeier, Ibbenbüren (DE); Michael Bergmann, Herzebrock-Clarholz (DE); Lukas Eidhoff, Rheda-Wiedenbrück (DE)

(73) Assignee: C:AAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 16/059,382

(22) Filed: Aug. 9, 2018

(65) Prior Publication Data

US 2019/0045713 A1 Feb. 14, 2019

(30) Foreign Application Priority Data

Aug. 10, 2017 (DE) .......................... 10 2017 118 252

(51) Int. Cl.
*A01D 89/00* (2006.01)
*A01D 61/00* (2006.01)
*B65G 65/16* (2006.01)

(52) U.S. Cl.
CPC .......... *A01D 89/002* (2013.01); *A01D 61/008* (2013.01); *B65G 65/16* (2013.01)

(58) Field of Classification Search
CPC ...... B65G 33/26; B65G 33/265; B65G 33/33; F16B 7/1418; F16B 7/1427; F16B 7/1454; A01D 61/008
See application file for complete search history.

(56) References Cited

U.S. PATENT DOCUMENTS 6,158,571 A * 12/2000 Gosa .................... A01D 61/008
198/613
7,600,734 B2 * 10/2009 Clarke ................... A45B 25/00
135/120.3

(Continued)

FOREIGN PATENT DOCUMENTS

DE 1159351 B 12/1963
DE 1214464 B 4/1966

(Continued)

OTHER PUBLICATIONS

European Search Report for EP Application No. 18170477.6-1006, dated Nov. 20, 2018.

*Primary Examiner* — William R Harp
(74) *Attorney, Agent, or Firm* — Lempia Summerfield Katz LLC (57) ABSTRACT

A driver unit for a conveyor is disclosed. The driver unit includes a drive finger, driving conveyed material, and a holding body for positioning the drive finger on the rotary conveyor. The holding body has a socket into which an end section of the drive finger can be inserted. Furthermore, a securing element is used to secure the drive finger to the socket, whereby the securing element includes a section arranged eccentric to an axis of the securing element to hold the drive finger in the socket.

20 Claims, 6 Drawing Sheets

(56) References Cited

U.S. PATENT DOCUMENTS 8,905,225 B2 12/2014 Domokos et al.
2006/0252472 A1 11/2006 Lanzinger
2014/0090959 A1 4/2014 Domokos et al.

FOREIGN PATENT DOCUMENTS

EP 1712121 A1 10/2006
EP 2712495 A2 2/2014

* cited by examiner

DRIVER UNIT FOR A ROTARY CONVEYOR, DRIVE FINGER AND ROTARY CONVEYOR

CROSS REFERENCE TO RELATED APPLICATION

This application claims priority under 35 U.S.C. § 119 to German Patent Application No. DE 102017118252.7, filed Aug. 10, 2017, the entire disclosure of which is hereby incorporated herein by reference.

TECHNICAL FIELD

The technical field relates to an agricultural machine. More specifically, the technical field relates to a driver unit for a rotary conveyor having a drive finger as the driver of conveyed material, a holding body for connecting the drive finger to the rotary conveyor, a drive finger for such a driver unit, and a rotary conveyor.

BACKGROUND

EP 2 712 495 A2 or DE 1 159 351 disclose driver units that are used in a rotary conveyor of a harvesting machine. U.S. Pat. No. 8,905,225 claims priority to EP 2 712 495 A2 and is incorporated by reference herein in its entirety. The drive finger (also known as a feeder aid) of the driver units are mounted on the rotary conveyor and assist in the removal of harvested material that is conveyed through the rotary conveyor, such as, for example, to a threshing unit of the harvesting machine. The drive fingers are arranged on a control axle arranged eccentric to the mid-axis of the rotary conveyor, such as not being positioned centrally or not having its axis or other part positioned centrally, and project to the outside through openings in the casing of the rotary conveyor. The eccentric positioning of the drive fingers causes the drive fingers to extend or protrude outward more or less depending on the rotary position of the rotary conveyor. In this regard, the collection or discharge of the harvested material may be performed depending on the applicable use.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

In practice, the drive fingers (also known as feeder aids) may break due to unwanted items collected, such as rocks or the like, when conveying harvested material using the rotary conveyor. The damaged drive fingers must then be exchanged. Typically, exchanging the drive fingers is complicated and requires the use of tools.

In one implementation, a driver unit is disclosed that enables fastening to and/or unfastening of the drive finger to the holding body in a simpler manner. In a specific implementation, the drive fingers may be replaced without using tools (e.g., the drive fingers are detached from and fixedly fastened or attaching to the holding body without using tools). The manner of attachment of the drive finger may withstand a significant exertion of stress, such as may occur when using the driver unit in a rotary conveyor of a harvesting machine, without the drive finger disengaging from the holding body.

In one implementation, a driver unit for a rotary conveyor is disclosed that has a drive finger, which acts as the driver of conveyed material, and a holding body for connecting the drive finger to the rotary conveyor. The holding body may include a socket into which an end section of the drive finger is inserted. A securing element (also known as a connecting element) on the holding body may secure or connect the drive finger so that the drive finger is secured to (and prevents disengagement from) the socket. The securing element may include a section, arranged eccentric to an axis of the securing element (such as mid-axis), for holding the drive finger in the socket.

Furthermore, in one implementation, a drive finger for a driver unit is disclosed. The drive finger may have a rod-shaped (or cylindrically-shaped) main body that has a recess and/or a bevel on at least a part of a circumference of an end section of the main body, such as on the entire perimeter of the end section. In one implementation, due to the bevel, the cross-section of the main body tapers at an end of the main body.

In one implementation, a rotary conveyor, which may be part of a harvesting machine, may have one or more driver units. One, some or all of the driver units may include drive fingers that are secured or connected as disclosed herein.

A basic driver unit, such as one that is used for a rotary conveyor, has one or more drive fingers as the driver of or the mechanism to drive conveyed material such as harvested material. The driver unit may further include a holding body for placing or holding the drive finger in position in the rotary conveyor. In one implementation, the holding body includes a socket into which an end section of the drive finger is inserted. Further, the driver unit may have a securing element that locks the drive finger into its desired configuration, thereby preventing the drive finger from disengaging from the socket. The securing element may use a section arranged eccentric to an axis of the securing element, such as a mid-axis, for holding the drive finger in the socket. In particular, the axis of the securing element is arranged orthogonal or substantially orthogonal, to the longitudinal axis of the drive finger.

With such a driver unit, the drive finger may be more easily replaced with another drive finger by pulling out the drive finger from the socket. For this, the drive finger need only be removed from the eccentrically arranged section, also termed the eccentric section, which secures the drive finger. In this regard, removing the drive finger, such as in the context of exchanging the drive finger with another drive finger, may be accomplished by one person without a tool. At the same time, attachment of the drive finger to the holding body is performed using the disclosed plug-in connection together with locking, with the attachment being able to withstand a high amount of force without disconnecting.

Thus, the eccentric section may comprise a locking section that engages at least a part of the drive finger, such as a recess (e.g., a cutout) of the drive finger or the end section of the drive finger. In this way, the eccentric section may lock the drive finger in the socket. Specifically, using the eccentric section, the drive finger may thereby be secured in the socket in a form fit, preventing the drive finger from being pulled out.

In one implementation, the securing element may be rotatably mounted about the axis on the holding body, such as rotatably held, and may move, relative to the drive finger, in a rotary movement to an unlocked and/or locked position (e.g., the securing element moves in a rotary manner about the axis of the eccentric section from an unlocked position into a locked position relative to the drive finger). In this way and using this simple movement, the drive finger may be easily exchanged. Specifically, for this, the securing element need only be subject to a rotary movement from the locked position into the unlocked position. With the securing element in the unlocked position, the drive finger may then be pulled out of the socket of the holding body. When installing the drive finger in the holding body, one may proceed in the same manner in order to lock the drive finger into the socket. For example, a rotary movement (opposite to the rotary movement to unlock) is performed in order to bring the eccentric section from the unlocked position into the locked position.

In one implementation, the eccentric section laterally engages in the socket in the locked position, and for the axis of symmetry of the eccentric section to be sufficiently spaced from the axis of the securing element so that the socket is released from the eccentric section in the unlocked position. As one example of sufficient spacing, the eccentric section may lie outside of the socket in the unlocked position. In particular, these axes, i.e., the axis of the securing element and the axis of symmetry of the eccentric section, may be axially parallel relative to each other. In this regard, the sufficient spacing may be such that the axis of symmetry and the axis of the securing element are not co-linear.

In one implementation, the securing element may comprise a bolt or pin that is mounted by at least one, or both, of its end regions against the holding body, and has an intermediate region between the end regions that form the eccentric section. This promotes a secure and lasting connection of the securing element on the holding body, and is simultaneously formed by the intermediate section of the eccentric section. In particular, the end regions may form bearing points for rotatably bearing against the holding body.

The eccentric section may have a round cross-section (e.g., circular), and may have a diameter that is less than the round (e.g., circular) cross-section of at least one of the end regions. For example, when viewed in the cross-section, the outer perimeter of the eccentric section may lie at least partially on the outer perimeter of the end region of the securing element. In this way, the driver unit may comprise a technically simple design. Due to the round design with regard to the cross-section of the eccentric section, easier locking against the drive finger may be achieved.

According to one implementation, the end section of the drive finger has a bevel such that the end section tapers toward the associated end. The socket, into which the end section is inserted, may be designed with a correspond shape, such as shaped to have a mating bevel. In this way, the attachment of the drive finger to the socket may be without play or without movement. The attachment without play may improve the life or longevity of the connection, for example since deflection may be avoided. For example, the bevel formed in the end section of the drive finger may be designed as conical. The mating bevel of the socket may correspondingly be designed as conical, e.g., have a mating cone shape.

In one implementation, the securing element may be connected to an actuating part, or the actuating part may be molded onto the securing element. For example, the securing element may be securely connected to the actuating part so that the eccentric section is brought into an operating position against the drive finger by actuating the actuating part. In this way, removing the drive finger from and/or mounting the drive finger to the holding body may be performed without tools. In one implementation, a handle may be included as an actuating element or part, allowing for manual activation of the securing element. For example, the eccentric section may be brought from the locked position into the unlocked position, and/or vice versa, from the unlocked position into the locked position, by manually actuating the actuating element or part. For example, the manual activation for the securing element may comprise a corresponding rotary movement about the axis, or its middle axis.

In one implementation, the actuating part may be designed as a resiliently acting clip or resiliently acting sleeve, and for the actuating part to be brought into a locked position while generating bias on the holding body such that at least a force component of the bias exerts pressure on the eccentric section toward the socket, and/or toward the inserted end section of the drive finger. Thus, structure may be used to secure the drive finger against disengagement from the socket, and to promote fixing the drive finger in the holding body without play.

In one implementation, the holding body may comprise a passage to accommodate a control shaft or control axle. In particular, the longitudinal axis of the socket and/or the longitudinal axis of the drive finger may be arranged radial to the mid-axis of the passage. Thus, the actuating part may at least partially surround the holding body around the passage opening. In addition or alternatively, the actuating part may be snapped on a peripheral section of the holding body. The holding body in the region of the passage, such as in the region of the edge of the passage, may thereby be used to bring the actuating part into a predetermined end position, such as the locked position.

In one implementation, the actuating part may have an end section that extends outward from the holding body in the locked position, and the holding body may have at least one, such as two, projections (or protrusions) that extend outward, of which each may have gripping surfaces together with the end section of the actuating part, for example for a manually-guided pinching grip in order to bring the actuating part out of the locked position, or into the locked position. This arrangement may promote tool-free actuation of the actuating part. The projections on the holding body enable the application of opposing force in order to disengage the actuating part, such as for example from its snap connection on the holding body without tools or conversely to establish such a snap connection.

In one implementation, a drive finger is provided that may be used as a drive finger in the above-described driver unit. The drive finger may have a rod-shaped main body, for example with a round or cornered cross-section, wherein the main body has a recess and/or a bevel on the perimeter of an end section. Due to the bevel, the cross-section of the main body tapers toward the associated end. The bevel may be designed as a cone.

In one implementation, a rotary conveyor is disclosed for use in a machine, such as in a harvesting machine. The rotary conveyor may have one or more driver units, with one, some or all of the driver units comprising the above-described driver unit.

Thus, the drive finger connected to the holding body of the driver unit may be replaced without tools. To fasten and/or unfasten the drive finger to/from the holding body, a plug-in connection may be used. In this way, securing may be performed manually, such as via a securing element, which may be locked by a clamping connection with the holding body, or may be locked when it exerts a securing function. With the disclosed fastening of the drive finger onto the holding body, the drive finger may be quickly and easily exchanged. At the same time, the drive finger may be affixed to the holding body without play.

Figure 1:
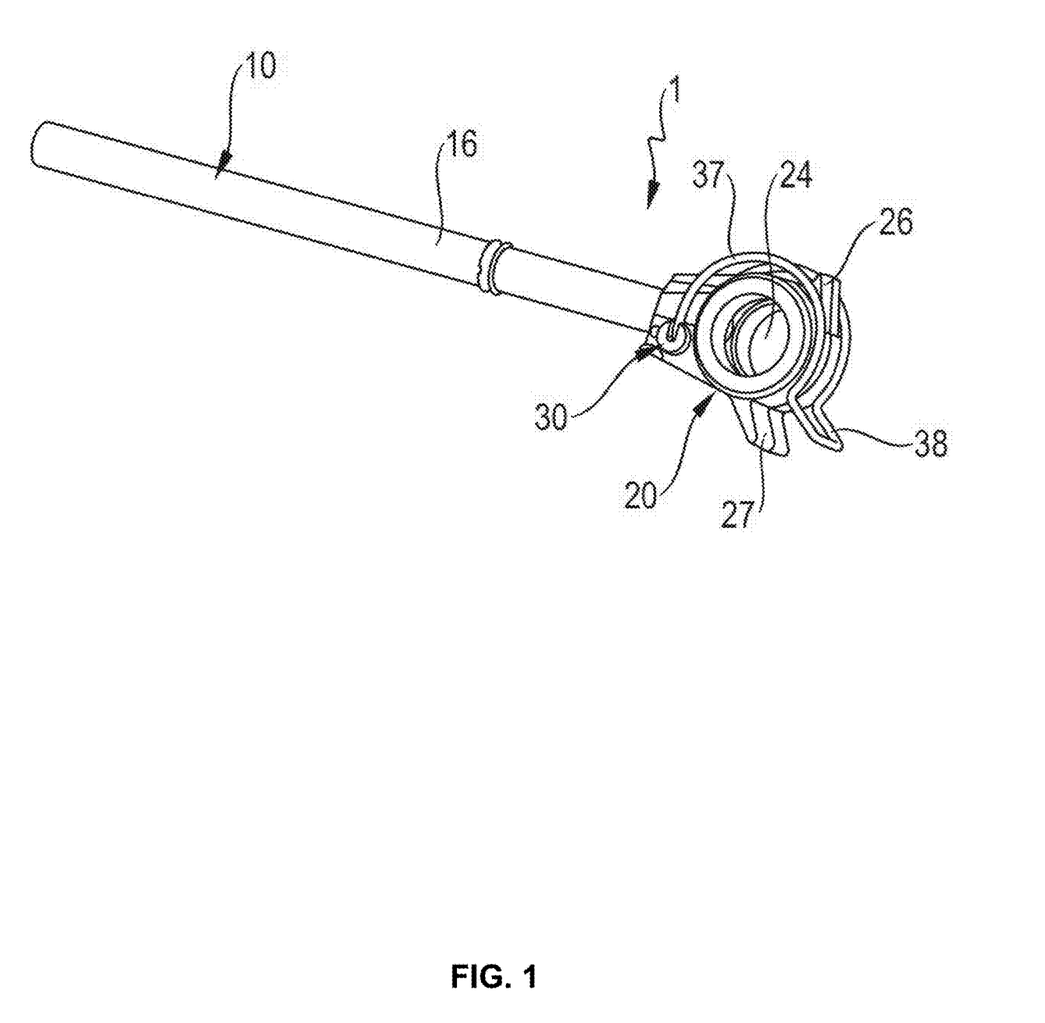
FIG. 1 shows a perspective view of one implementation of a driver unit for a rotary conveyor having a drive finger and a holding body that holds the drive finger.

Referring to the figures, FIG. 1 shows a schematic representation of one implementation of a driver unit 1 with a drive finger 10 and a holding body 20. The driver unit 1 may be used in a conveying device, such as a rotary conveyor 100, for example illustrated in FIG. 2. Other uses of the driver unit 1 are contemplated. The rotary conveyor 100 therein is a component of a harvesting machine 200 such as a combine and is for example arranged in the region of the cutting system of the harvesting machine. The rotary conveyor 100 may be configured to convey cut harvested material that for example comes from a reel unit 210. Using the rotary conveyor 100, the harvested material is, for example, supplied to another conveyor 220 such as a transverse conveyor.

Figure 2:
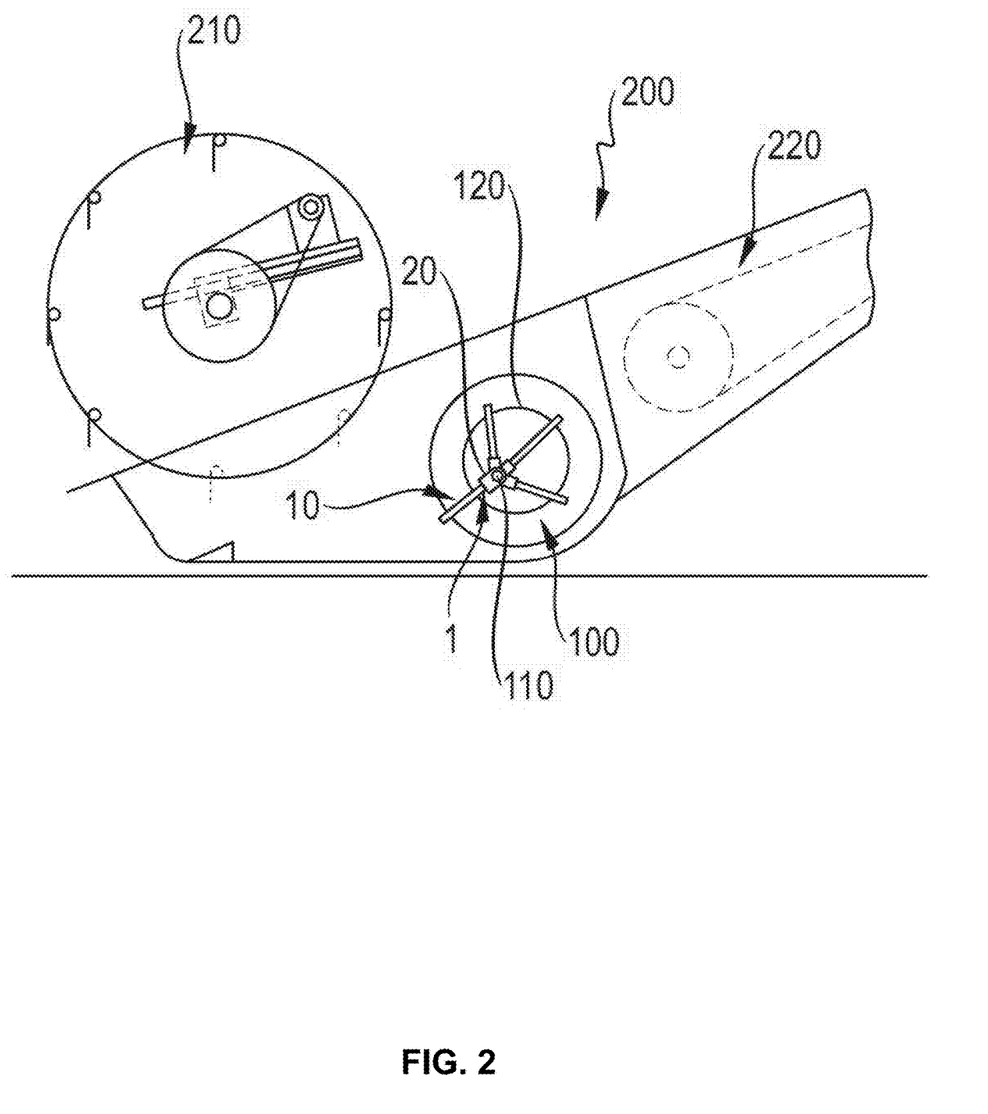
FIG. 2 shows a schematic view of one implementation of a harvesting machine with a rotary conveyor in which the driver unit in FIG. 1 is used.

The rotary conveyor 100 may have a plurality of driver units of which one, some or all of the plurality of driver units may be the driver unit 1 illustrated in FIG. 1. In the rotary conveyor 100, the holding body 20 of the driver unit 1 is mounted onto a control shaft 110 that is arranged eccentric to the mid-axis of the rotary conveyor 100. Consequently, when the rotary conveyor 100 rotates, the drive finger 10 projects more-or-less outward depending on the rotary position of the rotary conveyor 100 relative to its outer casing 120 or jacket. Accordingly, depending on the rotary position of the rotary conveyor 100, the drive finger 10 is extended or withdrawn relative to the outer casing 120. This makes it easier to collect the harvested material and discharge the harvested material.

Figure 3:
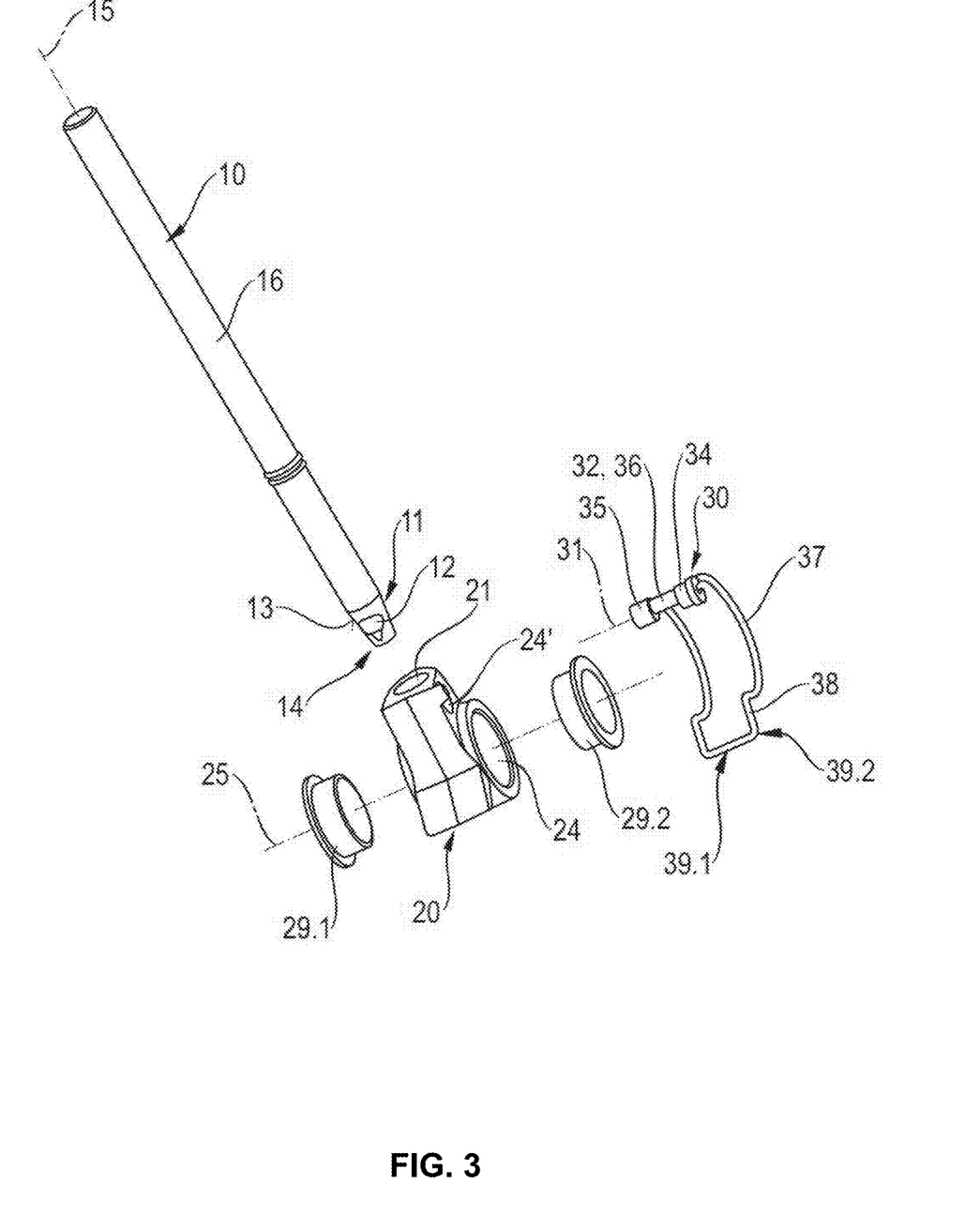
FIG. 3 shows an exploded view of the driver unit from FIG. 1.

In an exploded view, FIG. 3 shows the components and the design of the driver unit 1. The holding body 20 has, for example, a passage 24, which may receive therein the control shaft 110 of the rotary conveyor 100 illustrated in FIG. 2. In one implementation, the drive finger 10 may be arranged or positioned on the holding body 20 with its longitudinal axis 15 radial to the mid-axis 25 of the passage 24. In one implementation, the holding body 20 is designed as a pivot bearing with respect to a control shaft, such as the control shaft 110 of the rotary conveyor 100 illustrated in FIG. 2. In this regard, at least one, such as two bearing bushes 29.1, 29.2 may be provided, the face of each being introduced into the passage 24 of the holding body 20, and for example the face of each being brought into contact by an outwardly projecting collar against the edge of the passage 24.

The holding body 20 may include a socket 21 into which a part of the drive finger 10 (such as an end section of the drive finger) is or can be inserted. In one implementation, the longitudinal axis 23 of the socket 21 extends radially to the mid-axis 25 of the passage. The driver unit 1 furthermore has a securing element 30 that serves to secure the drive finger 10 against disengagement from the socket 21. In this regard, the securing element 30 has a section 32 which is arranged eccentric to an axis 31 of the securing element 30, such as the mid-axis of the securing element 30 (e.g., not situated in the center of the mid-axis of the securing element 30 and is situated off-axis to the mid-axis of the securing element 30), and serves to hold in position the drive finger 10 in the socket 21. In one implementation, the securing element 30 is rotatably mounted onto the holding body 20 about the axis 31, for example accommodated in a passage 24'. In this regard, the securing element 30 may be designed as a bolt or pin that is mounted by one or both of its end regions 34, 35 against the holding body 20 and has an intermediate region 36 between the end regions 34, 35 that forms the eccentric section 32.

In one implementation, the securing element 30 is connected, such as connected rigidly, to an actuating part 37, the actuation of which effectuates a rotary movement of the securing element 30 relative to the holding body 20. In one implementation, the actuating part 37 is formed as a resiliently acting clip or resiliently acting sleeve that may snap on the peripheral section of the holding body 20 surrounding the passage 24 while generating a spring force. For actuation, the actuating part 37 has an outwardly projecting end section 38 that may be gripped by both sides and may have a gripping surface 39.1, 39.2 on one or each of the two sides.

Figure 4A:
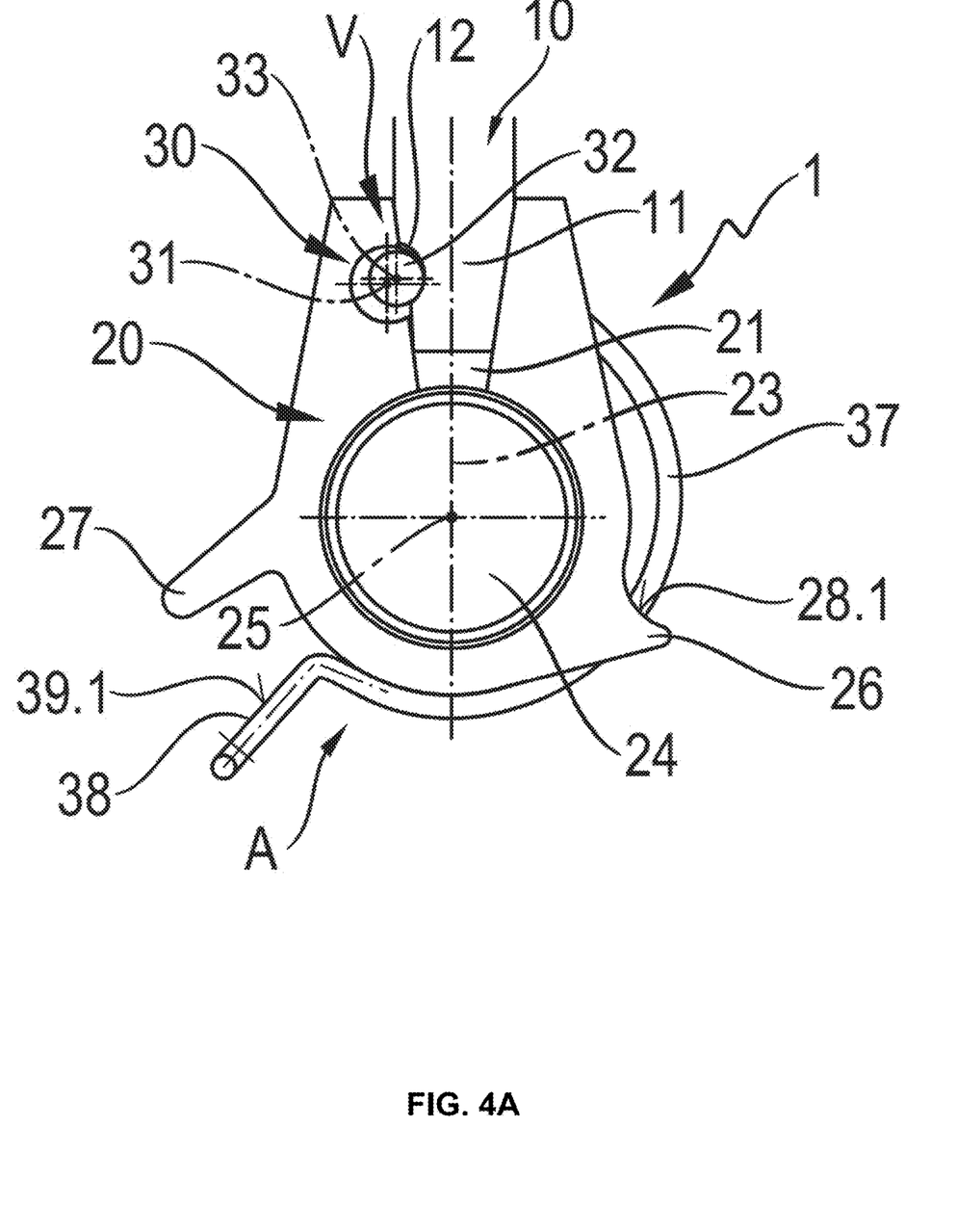
FIGS. 4A, 4B and 4C each show a sectional view of the driver unit from FIG. 1 at different states of engagement of the drive finger with the holding body, including the drive finger locked in the holding body (FIG. 4A), the drive finger transitioning from the locked to the unlocked position relative to the holding body (FIG. 4B), and the drive finger unlocked from the holding body (FIG. 4C).
Figure 4B:
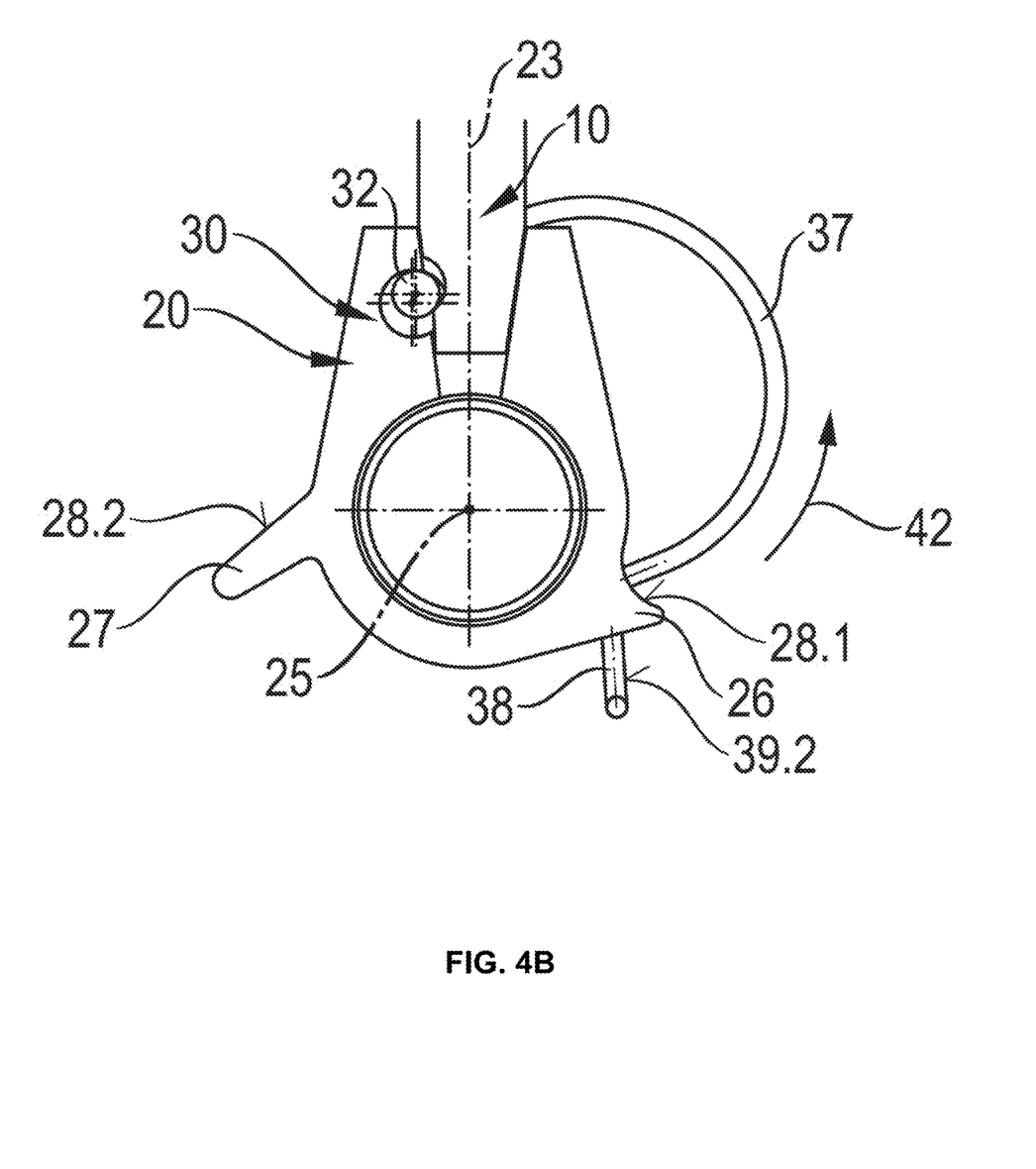
Figure 4C:
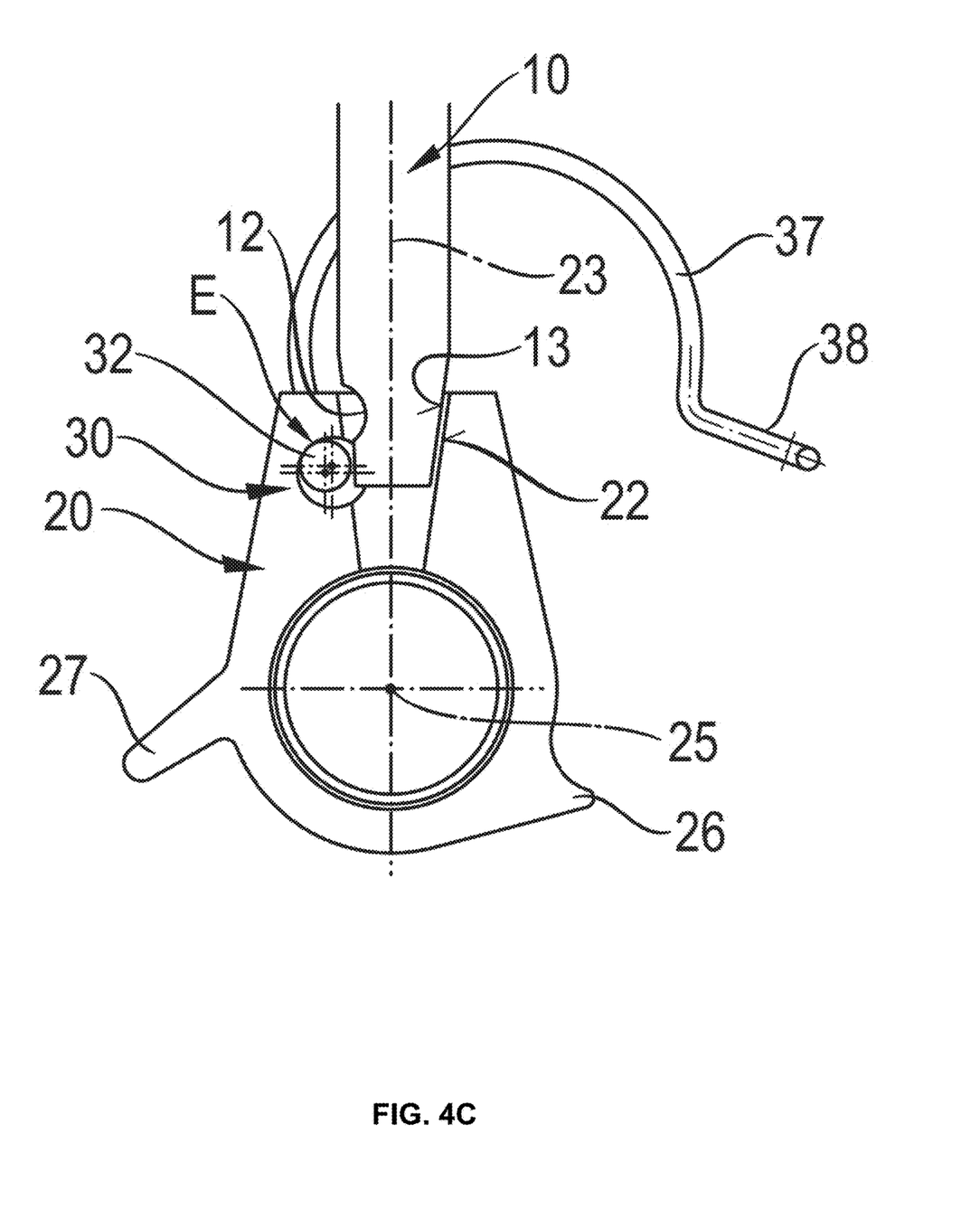

FIGS. 4A, 4B and 4C show a plurality of installation states, for example, that occur when removing the drive finger 10 from the holding body 20. In FIG. 4A, the drive finger 10 is inserted by its end section 11 into the socket 21 in the holding body 20, and the eccentric section 32 is in a locked position V relative to the drive finger 10. For the lock, a recess 12 may be included in the end section 11 of the drive finger 10. In the locked position V, the eccentric section 32 engages, for example by an outer wall section, in the recess 12 of the drive finger 10 in order to thereby lock in place the drive finger 10 in the socket 21.

In the locked position V, the actuating part 37 is located in a locked position A in which the actuating part 37 may at least partly surround or is clipped onto the holding body 20 around the passage 24 like a clamp. By the elastic effect of the actuating part 37, the actuating part 37 is pretensioned in the locked position A such that the bias exerts a pressure on the eccentric section 32 toward the socket 21, or toward the inserted end section 11 of the drive finger 10.

In order to be able to release the drive finger 10 from the holding body 20, the actuating part 37 is brought out of the locked position A. In one implementation, to accomplish this, the actuating part 37 has the outwardly facing end section 38, and an outwardly facing projection 26 is provided on the holding body 20 in the region of the outer perimeter around the passage 24. The projection 26 has a gripping surface 28.1 that, together with the gripping surface 39.1 on the end section 38 of the actuating part 37, may be used for a manually guided pinching grip by a user in order to remove the actuating part 37 from the locked position A. In so doing, the end section 38 and projection 26 are pressed toward each other by an actuating force. After having exited the locked position A, the actuating part 37 may be without bias.

Using the end section 38, a handle or a grip part is created on the actuating part 37 by which the actuating part 37 may be manually rotated about the axis 31 of the securing element 30. This occurs during an opening movement following the arrow 42, as can be seen in FIG. 4B. This brings the eccentric section 32 from the locked position V into an unlocked position E, which is illustrated in FIG. 4C. In the unlocked position E, the socket 21 is released from the eccentric section 32; in particular, the eccentric section 32 lies outside of the socket 21. In so doing, the axis of symmetry 33 of the eccentric section 32 is correspondingly positioned at a distance from the axis 31 of the securing element 30. In the unlocked position E, the securing element 30 is released, and the drive finger 10 may be drawn out of or disengaged from the socket 21. The drive finger 10 may then be removed from the holding body 20. This process of removing the drive finger 10 may be performed without tools, such without the use of tools throughout the entire removal process.

In the same manner, only in reverse sequence, the drive finger 10 may again be installed in the holding body 20. In so doing, the drive finger 10 may be introduced by its end section 11 into the socket 21 in the holding body 20 and may be brought into the end position in the socket 21. Then, the actuating part 37, located in the open position, is swung about the axis 31 toward the locked position A, which causes an eccentric rotary movement of the eccentric section 32 from the unlocked position E into the locked position V. The actuating part 37 is swung about the axis 31 toward the locked position A until it partially grasps the holding body 20 around the passage 24 while generating bias and forming a snap connection. In so doing, the end section 38 of the actuating part 37 on the one hand, and another outwardly extending projection 27 on the holding body 20 are gripped, and the projection 27 and the end section 38 are pressed relative toward each other by a grip surface 28.2 of the projection 27. After being grasped with a build-up of bias, the actuating part 37 is brought into the locked position A in which the actuating part 37 exerts its bias as pressure on the securing element 30, or the eccentric section 32.

Thus, in one implementation, the axis of symmetry 33 of the eccentric section 32 is positioned in at least two dimensions different from the axis 31 of the securing element 30 in the locked position V (see FIG. 4A). In the unlocked position E, the axis of symmetry 33 of the eccentric section 32 is likewise positioned in at least two dimensions different from the axis 31 of the securing element 30 (see FIG. 4C). However, the eccentricity of the eccentric section 32 is different in the locked position V as in the unlocked position E. For example, in the locked position V, the axis of symmetry 33 of the eccentric section 32, with the axis 31 of the securing element 30 taken as 0,0 in an x-y coordinate system, is in the first quadrant (as illustrated in FIG. 4A). In contrast, in the unlocked position E, the axis of symmetry 33 of the eccentric section 32, with the axis 31 of the securing element 30 taken as 0,0 in an x-y coordinate system, is in a different quadrant (such as the second quadrant or the third quadrant) than the first quadrant (as illustrated in FIG. 4C). In this regard, in transitioning from the locked position V to the unlocked position E, the axis of symmetry 33 of the eccentric section 32, with the axis 31 of the securing element 30 taken as 0,0 in an x-y coordinate system, transitions from the first quadrant to a different quadrant (e.g., to the second quadrant or the third quadrant).

As can be seen, for example, in FIGS. 3 and 4A-4C, the end section 11 of the drive finger 10 may have a bevel 13 at which the end section 11 tapers toward the associated end 14. In one implementation, the socket 21 is shaped to mate with bevel 13, such as having mating bevel 22. In one implementation, the bevel 13 is formed by a cone, wherein the mating bevel 22 correspondingly forms a mating cone. Further, in one implementation, the end section 11 with the bevel 13 is formed on an elongated main body 16 of the drive finger 10. The recess 12 may also formed therein.

In the present description, the reference to a certain element, or a certain embodiment, or a certain design means that a certain feature or a certain property that is described in conjunction with the respective element, or the respective embodiment, or the respective design is a least included therein, but does not necessarily have to be included in all of the elements, or embodiments, or designs of the invention. It is expressly noted that each combination of the different features, and/or structures, and/or properties that are described with regard to the invention are comprised by the invention, if not expressly or clearly contradicted by the context.

The use of individual or all examples, or an exemplary expression in the text is only to clarify the invention and fails to constitute a restriction with regard to the scope of the invention if not otherwise asserted. In addition, no expression or formulation of the description should be interpreted as being an unclaimed element that is however essential to the use of the invention.

REFERENCE NUMBER LIST 1 driver unit
10 Drive finger
11 End section
12 Recess
13 Bevel
14 End
15 Longitudinal axis
16 Main body
20 Holding body
21 Socket
22 Mating bevel
23 Longitudinal axis
24 Passage
24' Passage
25 Mid-axis
26 Projection
27 Projection
28.1 Gripping surface
28.2 Gripping surface
29.1 Bearing bush
29.2 Bearing bush
30 Securing element
31 Axis
32 Eccentric section
33 Axis of symmetry
34 End region
35 End region
36 Intermediate region
37 Actuating part
38 End section
39.1 Gripping surface
39.2 Gripping surface
42 Arrow 100 rotary conveyor
110 Control shaft
120 Casing
200 Harvesting machine
210 Reel unit
220 Conveyor
E Unlocked position
V Locked position
A Locked position It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A driver unit for a rotary conveyor, the driver unit comprising:
    a drive finger configured to drive conveyed material; and
    a holding body for positioning the drive finger on the rotary conveyor,
    wherein the holding body includes a socket into which an end section of the drive finger is inserted,
    wherein the holding body further includes a securing element configured to secure the drive finger from disengagement from the socket,
    wherein the securing element comprises an eccentric section arranged eccentric to an axis of the securing element for holding the drive finger in the socket, and
    wherein, with the securing element in a locked position, the eccentric section arranged eccentric to the axis is biased toward and engaging a recess of the drive finger in order to lock in place the drive finger in the socket.

2. The driver unit of claim 1, wherein the securing element is rotatably mounted on the holding body about the axis;
    wherein the securing element includes a locked position and an unlocked position; and
    wherein the securing element is configured to move from the unlocked position to the locked position via a rotary movement of the securing element about the axis of the eccentric section relative to the drive finger.

3. The driver unit of claim 2, wherein, with the securing element in the locked position, the eccentric section laterally engages in the socket; and
    wherein, with the securing element in the unlocked position, an axis of symmetry of the eccentric section is sufficiently spaced from the axis of the securing element so that the socket is released from the eccentric section.

4. The driver unit of claim 3, wherein the securing element comprises at least one end region; and
    wherein the securing element comprises a bolt or a pin that is mounted by the at least one end region against the holding body.

5. The driver unit of claim 1, further comprising an actuating part connected or molded onto the securing element such that actuation of the actuating part results in the eccentric section being arranged eccentric to the axis of the securing element in order to hold the drive finger in the socket.

6. The driver unit of claim 5, wherein the actuating part comprises a resiliently acting clip or a resiliently acting sleeve that includes into a locked position while generating bias on the holding body such that at least a force component of the bias exerts pressure on the eccentric section toward at least one of the socket or the end section of the drive finger.

7. The driver unit of claim 5, wherein the actuating part comprises a resiliently acting clip or a resiliently acting sleeve that includes into a locked position while generating bias on the holding body such that at least a force component of the bias exerts pressure on the eccentric section toward both of the socket and toward the end section of the drive finger.

8. The driver unit of claim 7, wherein the holding body includes a passage to accommodate a control shaft of the rotary conveyor or control axle of the rotary conveyor;
    wherein a longitudinal axis of the socket or a longitudinal axis of the drive finger are positioned radial to a mid-axis of the passage; and
    wherein the actuating part at least partially surrounds the holding body around the passage.

9. The driver unit of claim 8, wherein the longitudinal axis of the socket and the longitudinal axis of the drive finger are positioned radial to the mid-axis of the passage.

10. The driver unit of claim 8, wherein the actuating part is snapped onto a peripheral section of the holding body.

11. The driver unit of claim 8, wherein the actuating part includes an end section that extends outward from the holding body when the actuating part is in the locked position;
    wherein the holding body includes at least one projection that extends outward, the at least one projection having a gripping surface; and
    wherein the gripping surface and the end section of the actuating part are configured for a manually guided pinching grip in order to transition the actuating part from the locked position or into the locked position.

12. The driver unit of claim 8, wherein the actuating part includes an end section that extends outward from the holding body when the actuating part is in the locked position;
    wherein the holding body includes at least two projections that extends outward, each of the two projections having a gripping surface; and
    wherein the gripping surfaces and the end section of the actuating part are configured for a manually guided pinching grip in order to transition the actuating part from the locked position or into the locked position.

13. The driver unit of claim 1, wherein the drive finger has a rod-shaped main body;
    wherein the end section of the drive finger includes a bevel on a perimeter of the end section by which the end section tapers toward an end of the drive finger;
    wherein the drive finger further includes a recess; and
    wherein due to the bevel, a cross-section of the main body tapers toward the end.

14. A driver unit for a rotary conveyor, the driver unit comprising:
    a drive finger configured to drive conveyed material; and
    a holding body for positioning the drive finger on the rotary conveyor,
    wherein the holding body includes a socket into which an end section of the drive finger is inserted,
    wherein the holding body further includes a securing element configured to secure the drive finger from disengagement from the socket,
    wherein the securing element comprises an eccentric section arranged eccentric to an axis of the securing element for holding the drive finger in the socket,
    wherein the securing element comprises at least two end regions;

wherein the securing element comprises an intermediate region, between the at least two end regions, that forms the eccentric section; and wherein the securing element is mounting by the at least two end regions against the holding body.

15. A driver unit for a rotary conveyor, the driver unit comprising:
a drive finger configured to drive conveyed material; and
a holding body for positioning the drive finger on the rotary conveyor,
wherein the holding body includes a socket into which an end section of the drive finger is inserted,
wherein the holding body further includes a securing element configured to secure the drive finger from disengagement from the socket,
wherein the securing element comprises an eccentric section arranged eccentric to an axis of the securing element for holding the drive finger in the socket,
wherein the end section of the drive finger includes a bevel by which the end section tapers toward an end of the drive finger; and
wherein the socket is shaped to mate with the bevel of the end section.

16. A rotary conveyor comprising:
a plurality of driver units, wherein at least one driver unit of the plurality of driver units comprises:
a drive finger configured to drive conveyed material; and
a holding body for positioning the drive finger on the rotary conveyor,
wherein the holding body includes a socket into which an end section of the drive finger is inserted,
wherein the holding body further includes a securing element configured to secure the drive finger from disengagement from the socket,
wherein the securing element comprises a section arranged eccentric to an axis of the securing element for holding the drive finger in the socket, and
wherein, with the securing element in a locked position, the eccentric section arranged eccentric to the axis is biased toward and engaging a recess of the drive finger in order to lock in place the drive finger in the socket.

17. The rotary conveyor of claim 16, wherein the securing element is rotatably mounted on the holding body about the axis;
wherein the securing element includes a locked position and an unlocked position; and
wherein the securing element is configured to move from the unlocked position to the locked position via a rotary movement of the securing element about the axis of the eccentric section relative to the drive finger.

18. The rotary conveyor of claim 17, wherein, with the securing element in the locked position, the eccentric section laterally engages in the socket; and
wherein, with the securing element in the unlocked position, an axis of symmetry of the eccentric section is sufficiently spaced from the axis of the securing element so that the socket is released from the eccentric section.

19. The rotary conveyor of claim 16, wherein the securing element comprises at least two end regions;
wherein the securing element comprises an intermediate region, between the at least two end regions, that forms the eccentric section; and
wherein the securing element is mounting by the at least two end regions against the holding body.

20. The rotary conveyor of claim 16, wherein the end section of the drive finger includes a bevel by which the end section tapers toward an end of the drive finger; and
wherein the socket is shaped to mate with the bevel of the end section.

* * * * *

UNITED STATES PATENT AND TRADEMARK OFFICE
CERTIFICATE OF CORRECTION

Page 1 of 1

PATENT NO. : 10,542,675 B2
APPLICATION NO. : 16/059382
DATED : January 28, 2020
INVENTOR(S) : Christian Dahlke et al.

It is certified that error appears in the above-identified patent and that said Letters Patent is hereby corrected as shown below:

On the Title Page

Item (73) The Assignee:
"C:AAS"

Should be replaced with:
-- CLAAS --

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*